Oct. 12, 1954     E. PETERS     2,691,744
SIGNAL LIGHT SYSTEM FOR MOTOR VEHICLES
Filed Jan. 12, 1953
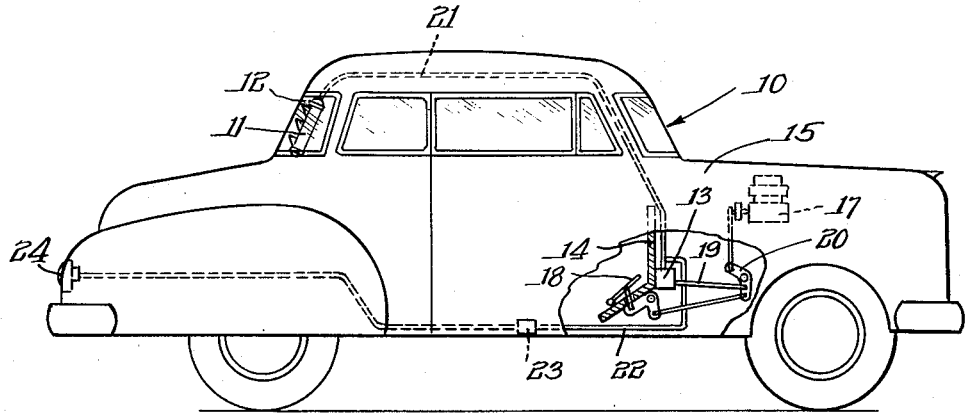
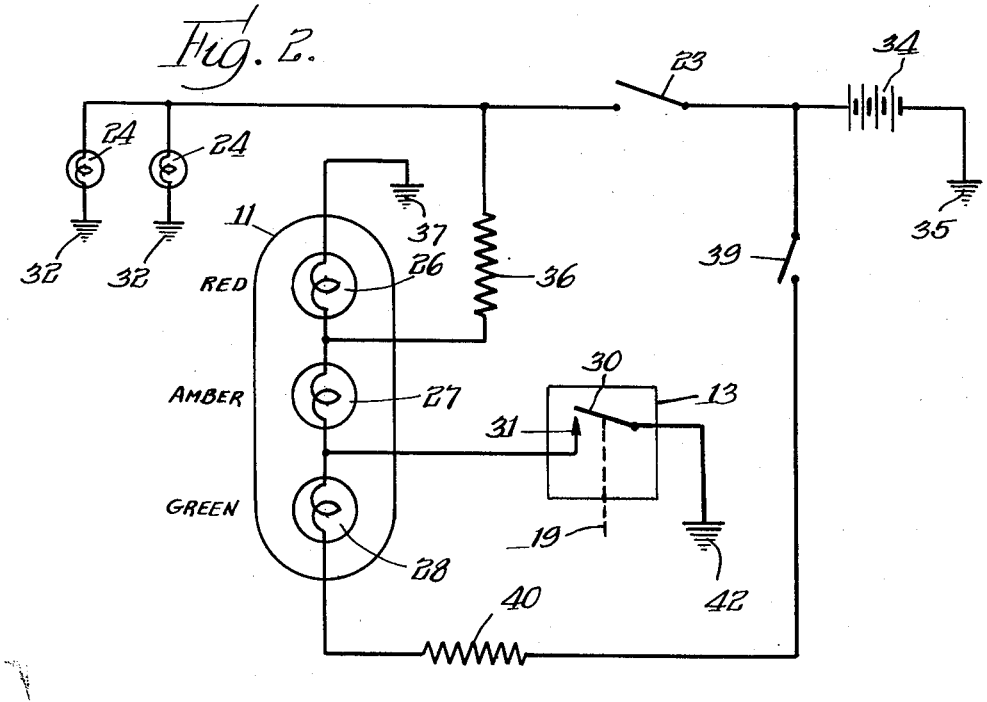
INVENTOR.
*Ernest Peters*
BY
*Wallenstein & Spangenberg*
attys.

Patented Oct. 12, 1954

2,691,744

UNITED STATES PATENT OFFICE 2,691,744

SIGNAL LIGHT SYSTEM FOR MOTOR
VEHICLES

Ernest Peters, Chicago, Ill., assignor, by direct and mesne assignments, to Auto Lamp Manufacturing Company, Chicago, Ill., a copartnership Application January 12, 1953, Serial No. 330,763

2 Claims. (Cl. 315—80)

This invention relates to signal light systems for motor vehicles such as automobiles or the like for advising operating conditions to following vehicles.

Motor vehicles in the past usually have had voltage sources of substantially 6 to 8 volts, but more recently they are being equipped with voltage sources of substantially 12 to 16 volts to accommodate the heavier electrical loads occasioned by the use of larger numbers of electrical accessories.

The principal object of this invention is to provide an improved signal light system which is adapted for use on vehicles having such higher voltage sources, such as 12 to 16 volts. By the use of this invention standard 6 to 8 volts signal lights may be successfully utilized with such higher voltage sources.

Briefly, the signal light system of this invention may be applied to a motor vehicle having a voltage source of substantially 12 to 16 volts, a ground, a brake operated switch and an accelerator mechanism. It includes red, amber and green signal lights, preferably included in a housing and facing rearwardly of the motor vehicle, for advising operating conditions to following vehicles, illumination of the red signal light indicating stopping or danger, illumination of the amber signal light indicating coasting, slowdown or caution, and illumination of the green signal light indicating normal progress or safety. The red and green signal lights are standard lights of substantially 6 to 8 volts and 2 candle power and the amber signal light is a standard light of substantially 6 to 8 volts and 1 candle power. A normally open switch is operated by the accelerator mechanism to closed position when the accelerator mechanism is depressed. The signal light system also includes first and second resistors. A first circuit extends from ground through the red signal light, the first resistor and the brake operated switch to the voltage source for illuminating the red signal light when the brake operated switch is closed. A second circuit extends from the voltage source through the second resistor, the green signal light and the amber signal light to the ungrounded side of the red signal light. A third circuit extends from ground through the accelerator mechanism operated switch to a point in the second circuit between the green and amber light. Because of the large difference in candle power ratings of the standard green and amber signal lights, only the green signal light is illuminated when the accelerator mechanism operated switch is closed and only the amber signal light is illuminated when the accelerator mechanism operated switch is opened.

The first and second resistors, connected as described above, reduce the voltage from the higher motor vehicle voltage source to the lower voltage ratings of the standard signal lights and thus provide for proper operation of the signal light system with standard signal lights having the necessary large difference in candle power ratings. Signal lights of higher voltage, 12 to 16 volts, with the necessary wide difference in candle power rating, substantially 2 to 1, are not available so that a signal light system like that described above, utilizing signal lights of different candle power ratings and without the voltage reducing resistors is practically commercially unfeasible.

Further objects of this invention reside in the details of construction of the signal light system and in the cooperative relationships between the component parts thereof.

Other objects and advantages of this invention will become apparent to those skilled in the art upon reference to the accompanying specification, claims and drawings in which:

Figure 1 is an elevational view of an automobile having the signal light control system of this invention applied thereto.

Figure 2 is a wiring diagram illustrating the signal light system of this invention.

Referring first to Figure 1, the signal light system of this invention is shown to be applied to a motor vehicle, such as an automobile, generally designated at 10. It includes a signal light housing 11 which is suspended in the automobile adjacent the rear window 12 thereof with the signal lights facing outwardly through the rear window. This signal light housing may take the form shown and described in the co-pending application of Oscar W. Dorfman and Ernest Peters, Serial No. 245,196 filed September 5, 1951. In the event of original equipment, the signal light housing 11 may be dispensed with and the signal lights suitably built into the rear of the automobile 10.

The signal light system of this invention also includes a switch means 13 which is suitably secured in place adjacent the accelerator mechanism, as for example, on the fire wall 14 under the hood 15 of the automobile. The accelerator mechanism includes a linkage mechanism extending between the carburetor 17 and the accelerator pedal 18. The switch means 13 being located adjacent this accelerator linkage mechanism may be connected by a link 19 to any portion thereof, such as a bell crank lever 20. Thus, as the accelerator mechanism is depressed and released, the switch means 13 is operated. The switch means 13 is a single-pole single-throw switch which is normally open and which is closed upon depressing the accelerator mechanism. The signal lights in the signal light housing 11 may be connected by electrical connections 21 to the switch means 13 and to the voltage source of the automobile and by electrical connections 22 to the standard brake operated stop light switch 23 which controls the operation of the standard stop lights 24; said stop lights 24 having a voltage rating compatible with the voltage of the motor vehicle's electrical system, which in this instance is 12 to 16 volts.

Referring now to Figure 2, the signal light housing 11 includes red, amber and green signal lights 26, 27 and 28, respectively. These signal lights have voltage ratings of substantially 6 to 8 volts. The red and green signal lights 26 and 28 have a 2 candle power rating, while the amber signal light 27 has a 1 candle power rating. The red and green signal lights 26 and 28 may be standard #55 bulbs and the amber signal light may be a standard #51 bulb.

The single-pole single-throw switch means 13 may include a movable contact 30 for engaging a stationary contact 31, the movable contact 30 being operated by the link 19. The movable contact 30 is normally separated from the stationary contact 31, but is moved into engagement therewith by the link 19 when the accelerator mechanism is depressed. The switch means 13 may, of course, be of any type and may be operated in any suitable manner by the accelerator mechanism.

The voltage source of the motor vehicle is indicated at 34 and it is the more recent high voltage type of substantially 12 to 16 volts. The negative side of the voltage source 34 is connected to ground as indicated at 35, and the positive side thereof may be connected through the standard brake operated stop light switch 23 and the standard stop lights 24 to ground as indicated at 32. Thus, when the vehicle brakes are applied, the brake operated switch 23 is closed to illuminate the standard stop lights 24.

The signal light system of this invention also includes first and second resistors 36 and 40 and these resistors may be located within the housing 11, or if desired, they may be located outside of the housing. The system also includes a first circuit which extends from ground 37 through the red signal light 26 and the first resistor 36 to a point in the stop light circuit between the stop lights 24 and the brake operated switch 23. Thus, when the standard stop light switch 23 is closed to illuminate the standard stop lights 24, the red signal light 26 is also illuminated. The resistor 36 operates to reduce the voltage applied to the red signal light 26 from 12 to 16 volts to 6 to 8 volts.

The signal light system also includes a second circuit which extends from the positive side of the voltage source 34 through the ignition switch 39, the second resistor 40, the green signal light 28 and the amber signal light 27 to the ungrounded side of the red signal light 26. The signal light system further includes a third circuit which extends from ground 42 through the switch means 13 to a point in the second circuit between the amber and the green signal lights, 27 and 28.

When the accelerator mechanism is released, the switch means 13 is opened and current passes from the voltage source 34 through the ignition switch 39, the second resistor 40, the green signal light 28 and the amber signal light 27 and then takes parallel paths to ground, one path extending through the red signal light 26 to ground 37 and the other path extending through resistor 36 and the standard stop lights 24 to ground 32. The resistor 40 reduces the voltage applied to the signal lights from 12 to 16 volts to 6 to 8 volts. Because the green signal light 28 has a 2 candle power rating, while the amber signal light 27 has a 1 candle power rating, only the amber signal light 27 is illuminated. When, however, the accelerator mechanism is depressed to close the switch means 13, current flows from the voltage source 34 through the ignition switch 39, the resistor 40, the green signal light 28 and the contacts 31 and 30 of the switch means 13 to ground 42. In this way the green signal light of 2 candle power rating is connected directly to ground to increase the current flow therethrough so that the green signal light 28 is illuminated under these conditions. Here, no current flows through the amber signal light 27 so that it is extinguished.

Accordingly, in the signal light system of this invention only the amber signal light is illuminated when the accelerator mechanism and the brakes are released. When the brakes are applied, the red signal light is illuminated and the amber signal light is extinguished, the voltage applied to the red signal light 26 bucking the voltage applied to the amber signal light 27 to prevent current flow through the amber signal light. When the vehicle brakes are released, the red signal light 26 is extinguished and the amber signal light 27 is again illuminated. When the accelerator mechanism is depressed, the green signal light 28 is directly connected to ground to illuminate the same and the amber signal light 27 is extinguished. The selective operation of the amber signal light 27 and the green signal light 28 is dependent upon the wide difference in candle power ratings of these 2 signal lamps, a substantially 2 to 1 difference in rating. Signal lights of high voltage, 12 to 16 volts, with the necessary wide difference in candle power rating, substantially 2 to 1, are not commercially available. The only lights of this high voltage are #57 having a candle power rating of 1.5 and #53 having a candle power rating of 1. This small difference in candle power rating is not sufficient to permit these high voltage lights to be utilized in this signal light system for when used it is impossible to extinguish the green signal light 28. Thus, the inclusion of the resistors 36 and 40 provides for proper operation of the signal light system with standard lower voltage lights and at the same time makes possible the conversion of a lower voltage system for use with a high voltage motor vehicle voltage source.

While for purposes of illustration one form of this invention has been disclosed, other forms thereof may become apparent to those skilled in the art upon reference to this disclosure, and, therefore, this invention is to be limited only by the scope of the appended claims.

I claim as my invention:

1. A signal light system for a motor vehicle having a voltage source of substantially 12 to 16 volts, a ground, stop lights, a brake operated switch, a stop light circuit between the voltage source and ground including the brake operated switch and stop lights for illuminating the stop lights when the brake operated switch is closed by application of the vehicle brakes, and an accelerator mechanism, comprising red, amber and green signal lights, the red and green signal lights being substantially 6 to 8 volt lights of 2 candle power and the amber signal light being a substantially 6 to 8 volt light of 1 candle power, a normally open switch operated by the accelerator mechanism and moved to closed position when the accelerator mechanism is depressed, a first resistor, a first circuit extending from ground through the red signal light and the first resistor to a point in the stop light circuit between the stop lights and the brake operated switch for illuminating the red signal light when the brake operated switch is closed to illuminate the stop lights, a second resistor, a second circuit extending from the voltage source through the second resistor, the green signal light and the amber signal light to the ungrounded side of the red signal light and thence through portions of said first circuit to ground, and a third circuit extending from ground through the accelerator mechanism operated switch to a point in the second circuit between the green and amber signal lights, the arrangement being such that the green signal light only is illuminated when the accelerator mechanism operated switch is closed upon depressing the accelerator mechanism and that the amber signal light only is illuminated when the accelerator mechanism operated switch is opened upon releasing the accelerator mechanism.

2. A signal light system for a motor vehicle having a voltage source of substantially 12 to 16 volts, a ground, a brake operated switch and an accelerator mechanism, comprising red, amber and green signal lights, the red and green signal lights being substantially 6 to 8 volt lights of 2 candle power and the amber signal light being a substantially 6 to 8 volt light of 1 candle power, a normally open switch operated by the accelerator mechanism to closed position when the accelerator mechanism is depressed, a first resistor, a first circuit extending from ground through the red signal light, the first resistor and the brake operated switch to the voltage source for illuminating the red signal light when the brake operated switch is closed, a second resistor, a second circuit extending from the voltage source through the second resistor, the green signal light and the amber signal light to the ungrounded side of the red signal light and thence through portions of said first circuit to ground, and a third circuit extending from ground through the accelerator mechanism operated switch to a point in the second circuit between the green and amber signal lights for illuminating only the green signal light when the accelerator mechanism operated switch is closed and for illuminating only the amber signal light when the accelerator mechanism operated switch is opened.

References Cited in the file of this patent

UNITED STATES PATENTS

| Number | Name | Date |
| --- | --- | --- |
| 2,096,069 | Seiden | Oct. 19, 1937 |
| 2,128,769 | Finnell | Aug. 30, 1938 |
| 2,260,680 | Nelsen | Oct. 28, 1941 |